(No Model.)
T. W. & C. L. AMES.
Baling Press.
No. 242,421.  Patented June 7, 1881.
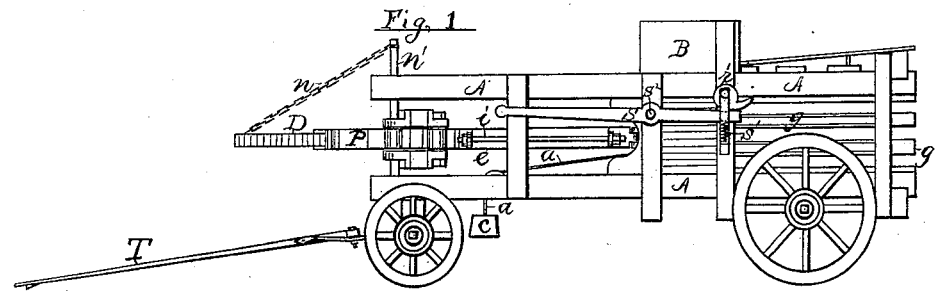
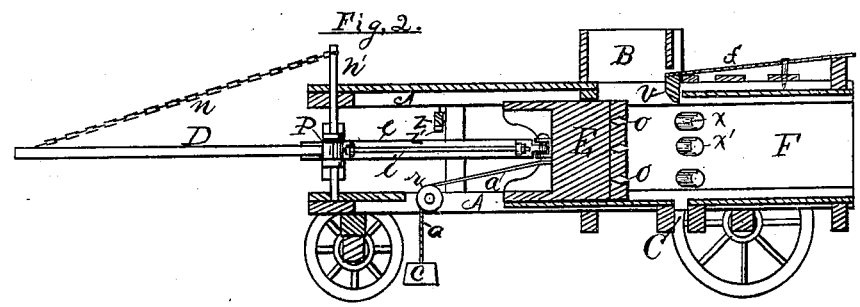
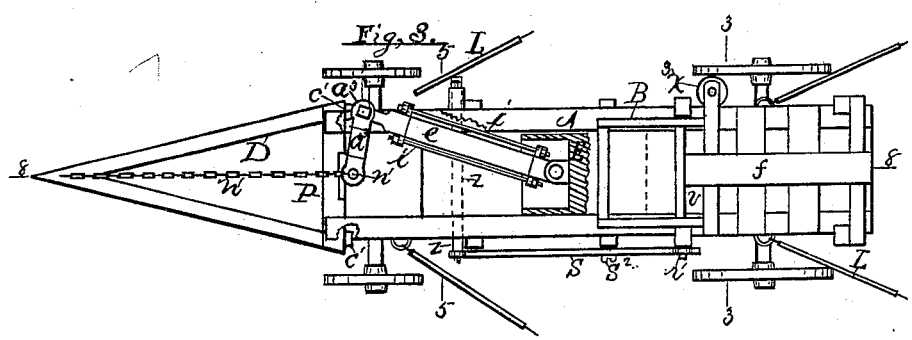
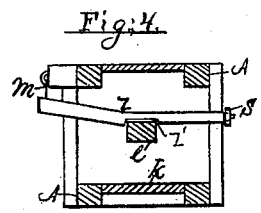  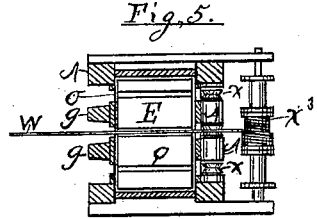
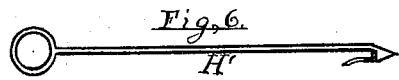  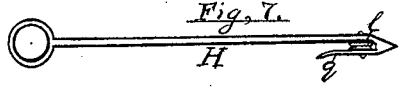
Witnesses
Thos. H. Hutchins
Wm. J. Hutchins
Inventors
Thomas W. Ames
Chester L. Ames
N. PETERS, Photo-Lithographer, Washington, D. C.

UNITED STATES PATENT OFFICE.

THOMAS W. AMES AND CHESTER L. AMES, OF CABERY, ILLINOIS.

BALING-PRESS.

SPECIFICATION forming part of Letters Patent No. 242,421, dated June 7, 1881.

Application filed March 7, 1881. (No model.)

*To all whom it may concern:*

Be it known that we, THOMAS W. AMES and CHESTER L. AMES, of Cabery, in Ford county, in the State of Illinois, have invented certain Improvements in Baling-Presses, the construction and operation of which we will proceed to explain, reference being had to the annexed drawings and the letters and figures of reference thereon, making a part of this specification, in which—

Figure 1 is a side elevation; Fig. 2, a vertical sectional view on the line 8; Fig. 3, a plan view on the top; Fig. 4, a cross-sectional view on the line 5, looking toward the rear; Fig. 5, a cross-sectional view on the line 3, looking toward the front; and Figs. 6 and 7 perspective views of the hooks for drawing through the baling wire or cord.

This machine is for the purpose of baling hay or other loose and fibrous material by forcing the loose material into a bale-chamber by successive additional charges and tying the bale before it is discharged, and while it is within the baling-chamber before it is discharged by a succeeding newly-formed bale. The machine is of the class known as "horizontal" or "procumbent" machines.

In the drawings, A is the main frame of the machine, supported on trucks to be portable, and is rectangular in shape, the lower sills resting on the axles of the wheels and the upper sills supported by upright pieces at the sides, and bolted thereto in a substantial manner.

The frame A is provided with a reciprocating follower, E, at the rear of which is the baling-chamber F, into which the material to be baled is forced by the follower E, which is caused to travel backward and forward by means of the double cam P operated by the sweep D.

The swinging crank $a^3$ is pivoted at one end to the upright or vertical shaft $n'$ and at the other to the horizontal pitman $e$, which is hinged to the rear side of the follower E. To the front of the swinging crank $a^3$, and pivoted to the vertical shaft $n'$, is the double cam P, which, as it swings from one side to the other by means of a horse attached to the outer end of the sweep D, straightens the elbow formed by the swinging crank and pitman, so as to bring them in line with each other, and thus forces the follower E toward the rear end of the machine against the material to be baled. As the swinging crank passes the center the follower is drawn back by the cord $a$ and weight $c$ attached thereto, so as to be out of the way for another charge of material in front of it, which is fed from the hopper B on the top of the machine.

The cam P has bearings $c'$ at its outer extremities, formed to bear upon the outer end of the horizontal pitman $e$, to cause it to work easily and without injury to the parts, as is shown in Fig. 3.

The pitman $e$ is constructed with a wooden center shaft, having metal hinged ends held together on the ends of the pitman by the side rods, $i$, having nuts at their ends to tighten them up when it is necessary.

Heretofore the pitman $e$ has been unprovided with means for holding it in a straight line with the crank $a^3$ to hold the follower E steady against the material in the baling-chamber while the bale was being tied, neither has the follower been provided with any means for pulling it back after it has been forced forward. It is in these two things, and in the construction of the swinging crank and its cam and pitman, that we claim to have made a part of our improvements. To hold the pitman in the position described we attach the lever $z$, hung to one side of the machine at $m$, and supported at the other end by the lever $s$ on the side of the machine, which lever $s$ operates the lever $z$ up and down, so as to cause it to rest on the pitman $e$ in a notch, $z'$, as is shown more particularly in Fig. 4. By this means the pitman cannot move until desired by raising the lever $z$ up, so the pitman can pass the notch. The lever $s$ is pivoted to the outer side of the machine at $s^2$, Fig. 3, and has the cam $r'$ and spring $s'$ on its handle end to hold that end up or down.

Another feature we claim to have improved is the shape of the grooves $o$ in or across the front face of the follower E where the tie is pulled through. Heretofore these grooves have been constructed wide at their front opening, so that they would fill with dust, straw, &c., and render it difficult and sometimes impossible to pull the tie through them. We obviate all this difficulty by constructing the groove so that it has a very narrow opening next the bale, as shown in Fig. 2 at $o$, leaving just room enough for the tie to pull out of it. This is a very great improvement, keeping all the straw and dirt out, so the tie can always be got through readily, no matter how tight the follower presses against the bale.

Another improvement we have made is in the manner of baling or tying the bale. The bale-tie is generally to be wire, which is placed on the reel $x^3$, Figs. 3 and 5, outside the machine. One or more spools or reels may be used, but only one is shown to illustrate the device. Before any material is forced into the baling-chamber E the wire $w$ is pulled through the machine through the grooves $o$ of the follower out through the bars $g$, as is shown in Fig. 5. When the straw is forced in the baling-chamber it is forced against the wire $w$, carrying it back, as the bale is forced back, until the bale is ready to tie, drawing the wire very tightly by its frictional contact with the inner sides of the baling-chamber. The hook shown at Figs. 6 and 7 is then used to run through the grooves $o$ of the follower out of the holes $x'$ at the opposite side, to catch the wire $w$ and draw it through, when it is tied around the bale, the end off the reel being left cut off from the bale and ready to tie around the next succeeding bale, as is shown in Fig. 5. The rollers $x$ in the side of the machine are for the wire $w$ to run in, as shown in said figure.

The hooks may be provided with a roller, $l$, in the crotch between the barb $q$ and the body of the hook, as is shown in Fig. 7, to cause the wire $w$ to run through it easily in the operation described.

The finished bale forms a bulk-head to press a succeeding bale against by its frictional contact with the sides of the baling-chamber, and is discharged by pressure from the succeeding bale at the rear of the machine.

To steady the machine and hold it in proper position we use the braces L, hinged to the outer sides of the machine, with their lower ends in the ground, as shown in Fig. 3.

Immediately under the front end of the baling-chamber, and extending across the bottom of the machine, is a slot or opening, C, Fig. 2, which is for the purpose of discharging any dirt, seed, &c., so it will not be taken up and included in the bale. This is another feature we have invented and deem quite important.

We are aware that procumbent baling-presses, with reciprocating followers forming bales by successive or additional charges within the baling-chamber, have been used, but not with the several improvements we have named.

Having thus described our invention, what we claim as new, and desire to secure by Letters Patent is as follows, to wit:

1. In a procumbent baling-press, the hook H, having the friction-roller $l$ in the crotch of the barb $q$, in combination with the follower E, having the horizontal narrowed tying-slots $o$ in its face, external reels, $x^3$, on the side of the press-box F, and friction-rollers $x$, all arranged to operate in the manner and for the purpose set forth.

2. In a procumbent baling-press, the levers $s$ and $z$, having the notch $z'$, to engage with and hold the pitman $e$, in the manner and for the purpose set forth.

3. The combination of the sweep D, double cam P, vertical shaft $n'$, swinging crank $a^3$, pitman $e$, tightening-rods $i$, follower E, cord $a$, weight $c$, and frame A, arranged to operate as and for the purpose set forth.

THOMAS W. AMES.
CHESTER L. AMES.

Witnesses:
J. R. GREENE,
J. P. AMES.